US010810586B2

(12) United States Patent
Imoto

(10) Patent No.: US 10,810,586 B2
(45) Date of Patent: Oct. 20, 2020

(54) CURRENCY INFORMATION PROCESSOR AND CURRENCY INFORMATION PROCESSING SYSTEM

(71) Applicant: Standard Transaction Co., Ltd., Tokyo (JP)

(72) Inventor: Masaru Imoto, Tokyo (JP)

(73) Assignee: Standard Transaction Co., Ltd., Tokyo (JP)

( * ) Notice: Subject to any disclaimer, the term of this patent is extended or adjusted under 35 U.S.C. 154(b) by 0 days.

(21) Appl. No.: 16/466,205

(22) PCT Filed: Sep. 13, 2018

(86) PCT No.: PCT/JP2018/034077
§ 371 (c)(1),
(2) Date: Jun. 3, 2019

(87) PCT Pub. No.: WO2020/008658
PCT Pub. Date: Jan. 9, 2020

(65) Prior Publication Data
US 2020/0097958 A1 Mar. 26, 2020

(30) Foreign Application Priority Data
Jul. 3, 2018 (JP) .................................. 2018-126586

(51) Int. Cl.
*G06Q 20/38* (2012.01)
*G06F 16/23* (2019.01)
(Continued)

(52) U.S. Cl.
CPC ....... *G06Q 20/389* (2013.01); *G06F 16/2365* (2019.01); *G06F 16/2379* (2019.01);
(Continued)

(58) Field of Classification Search
CPC .................................................... G06Q 20/389
See application file for complete search history.

(56) References Cited

U.S. PATENT DOCUMENTS

2018/0240191 A1* 8/2018 Aronson ............ G06Q 20/3823
2019/0034919 A1* 1/2019 Nolan .............. G06Q 20/38215
(Continued)

FOREIGN PATENT DOCUMENTS

JP 2002222318 A 8/2002
JP 2017162019 A 9/2017
(Continued)

OTHER PUBLICATIONS

Antonopoulos, Andreas, "Mastering Bitcoin," O'Reilly Media Inc., all pages. (Year: 2014).*
(Continued)

*Primary Examiner* — Jacob C. Coppola
(74) *Attorney, Agent, or Firm* — Fox Rothschild LLP

(57) ABSTRACT

There is provided a currency information processor for enabling secure and reliable use of cryptocurrency on a blockchain in which a value is secured and a value variation risk is reduced.

A currency information processor 200 is capable of processing cryptocurrency in a method of validating a transaction of cryptocurrency on a blockchain 500 on the basis of a plurality of signatures, and includes a receiving unit, a temporary issuing unit, and a setting unit. The receiving unit is capable of receiving cryptocurrency issuance request including a first signature from a user. The temporary issuing unit issues temporary cryptocurrency on the blockchain on the basis of the cryptocurrency issuance request. When a second signature is received from a custodian within a predetermined period after the temporary cryptocurrency is issued and the second signature is confirmed to be valid, the setting unit sets the temporary cryptocurrency issued by the (Continued)

temporary issuing unit to be processed as valid cryptocurrency that has been approved.

9 Claims, 4 Drawing Sheets

(51) Int. Cl.
  *G06Q 20/06* (2012.01)
  *G06Q 20/40* (2012.01)
(52) U.S. Cl.
  CPC ......... *G06Q 20/065* (2013.01); *G06Q 20/405* (2013.01); *G06Q 2220/00* (2013.01)

(56) References Cited

U.S. PATENT DOCUMENTS

2019/0220859 A1* 7/2019 Weight ............. G06Q 20/40145
2019/0236565 A1* 8/2019 Song .................. G06Q 20/3829
2020/0097958 A1* 3/2020 Imoto ................. G06F 16/2379

FOREIGN PATENT DOCUMENTS

JP        2018032080 A     3/2018
WO    WO-2017060816 A1 * 4/2017 ............. G06Q 40/00

OTHER PUBLICATIONS

Extended European Search Report dated Sep. 20, 2019 for European Application No. 18882275.3.
Nakamoto, S., "Bitcoin: A Peer-to-Peer Electronic Cash System," (2008); 1-9.
Written Opinion of the International Searching Authority dated Nov. 27, 2018 for International Application No. PCT/JP2018/034077.

* cited by examiner

CURRENCY INFORMATION PROCESSOR AND CURRENCY INFORMATION PROCESSING SYSTEM

TECHNICAL FIELD

The present invention relates to a currency information processor and a currency information processing system, in particular, information of cryptocurrency using a blockchain.

BACKGROUND ART

In recent years, various techniques using a blockchain technique, such as cryptocurrency (or virtual currency) and the like, have been known. The blockchain technique has been established around 2009, and various kinds of currency on the blockchain, including bitcoin, have been proposed. According to the new technology called blockchain, it becomes possible to reduce risks and server costs required for currency processing, and to reduce many risks including a credit risk, a fail risk, and the like. In addition, by combining a peer-to-peer (P2P) network and a distributed ledger technology, it is being established as a new transparent infrastructure monitored from around the world.

Meanwhile, there are also problems that cannot have been solved in the currency on the blockchain. One of them is high price volatility due to the lack of assurance of an asset value of the currency on the blockchain. As described above, since the problem of high price volatility potentially remains in the currency on the blockchain, there has been a problem that the innovative technology called blockchain has not been widely used in a general way in spite of the various advantages as described above.

Further, in the cryptocurrency on the blockchain, information other than the cryptocurrency can also be described by issuing a token or a bond of debt (generally referred to as IOU), or by providing a layer (what is called second layer) in the blockchain. Furthermore, it has also been proposed to secure, in the token, the second layer, or the like, the value of the issued coin on the principle that the value is indirectly guaranteed by enabling exchange of the cryptocurrency on the blockchain using the information other than the cryptocurrency mentioned above. However, since the token and the coin as described above always use underlying cryptocurrency of some kind, they are affected by the price volatility of the original cryptocurrency that is the underlying cryptocurrency. Moreover, the token and or the bond of debt are issued on the blockchain in accordance with the arrangement (contracts) between involved parties, and the asset has not necessarily been secured, or a person or an organization who made the security has not necessarily given approval. Accordingly, there are some cases such as where marketing activities are carried out by referring to only fictive numbers exchanged on the blockchain as tokens, or where funds are financed at the timing of ICO (coin trade listing).

In order to solve the problems described above, it is conceivable to construct, on the blockchain, a system in which the asset can be registered without using the underlying cryptocurrency and the registration of the asset is approved by an asset management organization or custodian (e.g., trust bank or other organizations that offer custody business) to enable utilization as a coin (currency) (e.g., see Patent Literature 1).

CITATION LIST

Patent Literatures

Patent Literature 1: JP 2018-032080 A

SUMMARY OF INVENTION

Technical Problem

In the above-mentioned technique as disclosed in Patent Literature 1, in order to securely conduct a transaction while preventing fraud by a third party, such as hacking and the like, it is conceivable to adopt a multi-signature (multi-sig) scheme, and to employ a configuration in which a plurality of signatures is required for a transaction of a coin expressing a certain asset. In such a scheme, a plurality of signatures may be made by three parties consisting of a user, a coin issuer, and a custodian, or the plurality of signatures may be made by two parties of the user and the custodian.

However, the conventional multi-sig scheme is such that a transaction is established only when the plurality of signatures related to the coin transaction is fully available, and the transaction can be shared on the blockchain. Therefore, there has been a problem that fraud such as hacking and the like may be carried out while performing communication for obtaining a signature from the custodian or the like, for example, before the transaction is shared on the blockchain. In addition, there has been also a problem that it cannot be proved that the signature to be made by the custodian has been made by the custodian.

The present invention has been conceived in view of the circumstances described above, and an object of the present invention is to provide a currency information processor and a currency information processing system for enabling secure and reliable use of cryptocurrency on a blockchain in which a value is secured and a value variation risk is reduced.

Solution to Problem

The object mentioned above is achieved by the following means.

A currency information processor is capable of processing cryptocurrency in a method of validating a transaction of cryptocurrency on a blockchain on the basis of a plurality of signatures, and includes a receiving unit, a temporary issuing unit, and a setting unit. The receiving unit is capable of receiving, from a user, cryptocurrency issuance request including a first signature of the user related to issuance of the cryptocurrency. The temporary issuing unit issues temporary cryptocurrency on the blockchain on the basis of the cryptocurrency issuance request received by the receiving unit. When a second signature of a custodian related to the temporary cryptocurrency is received from the custodian within a predetermined period after the temporary cryptocurrency is issued by the temporary issuing unit and the second signature is confirmed to be valid, the setting unit sets the temporary cryptocurrency issued by the temporary issuing unit to be processed as valid cryptocurrency that has been approved.

A currency information processing system includes a user terminal, a currency information processor, and a custodian system that is connected via a network, and is capable of processing cryptocurrency in a method of validating transactions of cryptocurrency on a blockchain using a plurality of signatures. The user terminal includes a transmission unit that generates, on the basis of an instruction from the user, cryptocurrency issuance request including a first signature of the user related to issuance of the cryptocurrency having a value of a predetermined amount of a predetermined currency and transmits the cryptocurrency issuance request to the currency information processor, and a notification unit that notifies the custodian system of information associated with remittance of the predetermined amount directed to the custodian system and information associated with transmission of the cryptocurrency issuance request directed to the currency information processor. The currency information processor includes a receiving unit capable of receiving the cryptocurrency issuance request transmitted from the user terminal, a temporary issuing unit that issues temporary cryptocurrency on the blockchain on the basis of the cryptocurrency issuance request received by the receiving unit, and a setting unit that sets, when a second signature of the custodian related to the temporary cryptocurrency is received from the custodian within a predetermined period after the temporary cryptocurrency is issued by the temporary issuing unit and the second signature is confirmed to be valid, the temporary cryptocurrency issued by the temporary issuing unit to be processed as valid cryptocurrency that has been approved. The custodian system includes a confirmation unit that confirms, on the basis of notification from the user terminal, a fact that the temporary cryptocurrency corresponding to the predetermined amount has been issued in the currency information processor and a fact that remittance of the predetermined amount has been executed, and a transmission unit that generates, when issuance of the temporary cryptocurrency corresponding to the predetermined amount and execution of the remittance of the predetermined amount are confirmed by the confirmation unit, a second signature of the custodian related to the temporary cryptocurrency and transmits it to the currency information processor.

Advantageous Effects of Invention

According to the currency information processor of the present embodiment, in the method of validating transactions of the cryptocurrency on the blockchain on the basis of a plurality of signatures, when the cryptocurrency issuance request including the user signature is received from the user, the temporary cryptocurrency is issued on the blockchain. In the case where a valid custodian signature related to the temporary cryptocurrency has been received from the custodian within a predetermined period after the temporary cryptocurrency is issued, the issued temporary cryptocurrency is set to be processed as valid cryptocurrency that has been approved. This makes it possible to securely and reliably provide the cryptocurrency on the blockchain in which the value is secured and the value variation risk is reduced. Therefore, it is possible to allow value-stabilized cryptocurrency that can be used as asset holding means to be used securely and reliably.

DESCRIPTION OF EMBODIMENTS

Hereinafter, embodiments of the present invention will be described with reference to the accompanying drawings. Note that the same elements are denoted by the same reference signs in the description of the drawings, and duplicate description will be omitted. In addition, dimensional ratios of the drawings are exaggerated for purposes of illustration, and may be different from actual ratios.

Figure 1:
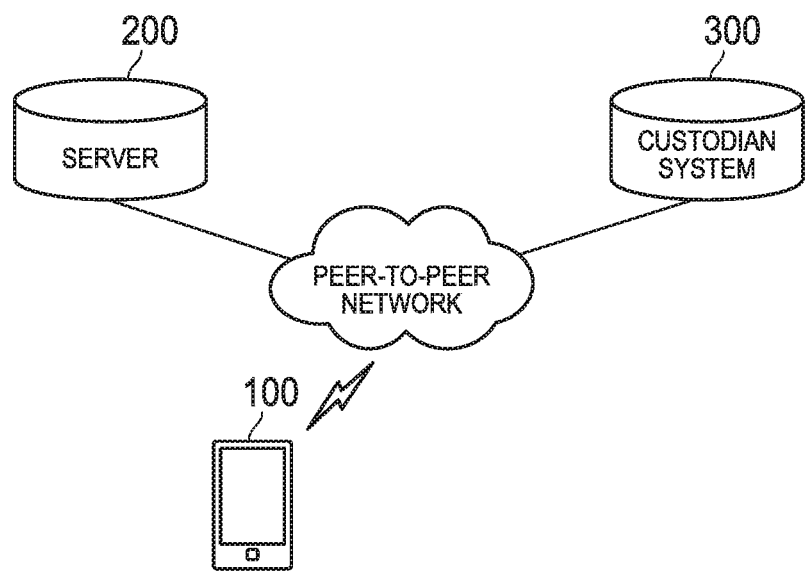
FIG. 1 is a diagram illustrating an overall configuration of a currency information processing system to which a currency information processor is applied.

FIG. 1 is a diagram illustrating an overall configuration of a system to which a currency information processor is applied.

A currency information processing system according to the present embodiment is provided to enable a user to use value-secured cryptocurrency on a blockchain securely and reliably.

The currency information processing system according to the present embodiment uses a method of validating transactions of cryptocurrency on the blockchain on the basis of a plurality of signatures.

As illustrated in FIG. 1, the currency information processing system includes a user terminal 100, a currency information processing server 200, and a custodian system 300, and respective configurations are configured to be mutually communicable through a peer-to-peer network and store a common blockchain.

The user terminal 100 is a mobile terminal such as a smartphone and the like, an information terminal such as a laptop computer, a desktop PC, and the like, which are used by the user.

The currency information processing server 200 is a server provided by a provider of cryptocurrency (coin), and provides the cryptocurrency. The currency information processing server 200 receives, from the user terminal 100, issuance request of the cryptocurrency and a first electronic signature of the user to temporarily issue the cryptocurrency, and receives, from the custodian system 300, a second electronic signature of a custodian to approve the temporarily issued cryptocurrency as valid. The currency information processing server 200 functions as a currency information processor.

The custodian system 300 is a system constructed in a trust bank, other organizations that offer custody business, and the like, which is a system for managing various assets of the user. The custodian system 300 includes, for example, a server. The trust bank or the like that constructs the custodian system 300 secures the value of the cryptocurrency issued on the blockchain in the present embodiment. For example, in a case where the cryptocurrency is issued in the unit of "yen coin" having a value equivalent to the real currency "yen", the trust bank or the like performs a process of cashing, currency conversion, or the like with the "yen coin" being treated as equal value of "yen".

When receiving generation request of the cryptocurrency including the first signature of the user related to issuance of the cryptocurrency from the user terminal 100, the currency information processing server 200 issues temporary cryptocurrency on the blockchain on the basis of the received cryptocurrency issuance request.

When the currency information processing server 200 receives, from the custodian system 300, the second signature of the custodian related to the temporary cryptocurrency within a predetermined period after the temporary cryptocurrency has been issued, and confirms the second signature is valid, it sets the issued temporary cryptocurrency to be processed as valid cryptocurrency that has been approved.

According to the currency information processing system of the present embodiment, while a method of validating transactions of the cryptocurrency on the basis of a plurality of signatures is adopted, issuance (creation) of the cryptocurrency on the blockchain can be requested even in the state where a plurality of signatures is not fully available. When the electronic signature of the user (hereinafter also referred to as user signature), which is the first signature, is confirmed to be valid, the issuance of the temporary cryptocurrency can be released on the blockchain on the basis of intention of the user.

The user designates a custodian that secures the value of the cryptocurrency and remits the amount corresponding to the value of the cryptocurrency to the custodian, and also transmits, to the custodian, information associated with the remitted amount, the address for which issuance of the cryptocurrency is requested, and the like.

For example, in a case where the user issues the cryptocurrency in which the value of 1 million yen is secured on the blockchain, the user requests issuance of "1 million yen coin", remits 1 million yen to the custodian, and notifies the custodian of the fact. In the present embodiment, the custodian secures that a "1 yen coin", which is cryptocurrency on the blockchain, has a value corresponding to "1 yen", which is real currency. The unit of the currency to which the cryptocurrency corresponds is not limited to "yen", and cryptocurrency corresponding to any unit of real currency, such as "dollar", "yuan", "euro", and the like, can be issued. For example, the custodian may secure that a "1 dollar coin" has a value corresponding to "1 dollar", which is real currency.

The custodian who has received the notification confirms existence of the request information related to the issuance of the "1 million yen coin" on the blockchain, and also confirms payment information such as a deposit amount and the like, and then generates an electronic signature of the custodian (hereinafter also referred to as custodian signature) related to the temporary cryptocurrency, which is the second signature, when the request information on the blockchain is consistent with the payment information. Since only the designated custodian can generate a valid second signature, the fact that the asset is secured by the custodian is made public on the blockchain.

When there is inconsistency between the request information and the payment information, the custodian does not generate the second signature for the transaction related to the temporary cryptocurrency. In that case, the custodian may notify the user to correct the inconsistency by, for example, mail, telephone, or the like. In response, the user may perform issuance request again with correct content on the blockchain, or may additionally execute remittance processing or an asset transfer to eliminate the inconsistency. As a result, the asset on the blockchain can be secured by the custodian upon agreement between the user and the custodian in cooperation. In addition, since only the designated custodian can generate the second signature, the risk of fraudulent actions performed by a third party, such as hacking and tapping, is also suppressed.

Hereinafter, each configuration of the currency information processing system will be specifically described.

Figure 2:
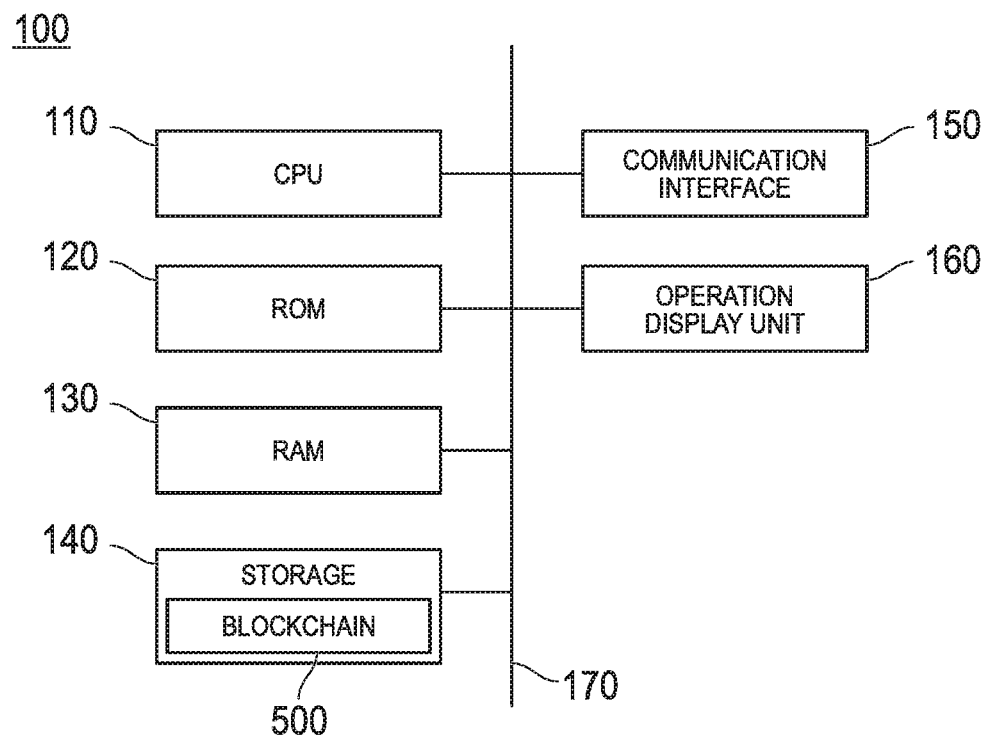
FIG. 2 is a block diagram illustrating a schematic configuration of a user terminal.

FIG. 2 is a block diagram illustrating a schematic configuration of a user terminal.

As illustrated in FIG. 2, the user terminal 100 includes a CPU (Central Processing Unit) 110, a ROM (Read Only Memory) 120, a RAM (Random Access Memory) 130, a storage 140, a communication interface 150, and an operation display unit 160. The respective configurations are communicably connected to each other via a bus 170.

The CPU 110 performs control of the respective configurations described above and various kinds of arithmetic processing in accordance with programs stored in the ROM 120 and the storage 140. The CPU 110 functions as a transmission unit and a notification unit by executing a program stored in the storage 140.

The ROM 120 stores various programs and various data.

The RAM 130 temporarily stores programs and data as a work area.

The storage 140 stores various programs including an operating system, and various data. For example, a request for receiving issuance request of cryptocurrency from the user and transmitting it to the currency information processing server 200, and a request for generating a first signature (user signature) of the user and transmitting it to the currency information processing server 200 are installed in the storage 140. In addition, a blockchain 500 in which information associated with the cryptocurrency is recorded is also stored in the storage 140. The blockchain 500 can be composed of a publicly known blockchain capable of processing various kinds of cryptocurrency, and detailed descriptions thereof will be omitted. Furthermore, a method of electronic signature using a secret key and a public key is also a publicly known technique, and detailed descriptions thereof will be omitted.

The communication interface 150 is an interface for communicating with another device via a network, and for example, a standard such as 3G and 4G for mobile telephony, a standard such as Wi-Fi (registered trademark), or the like is used.

The operation display unit 160 is, for example, a touch panel display, which displays various kinds of information and receives various inputs from the user.

Figure 3:
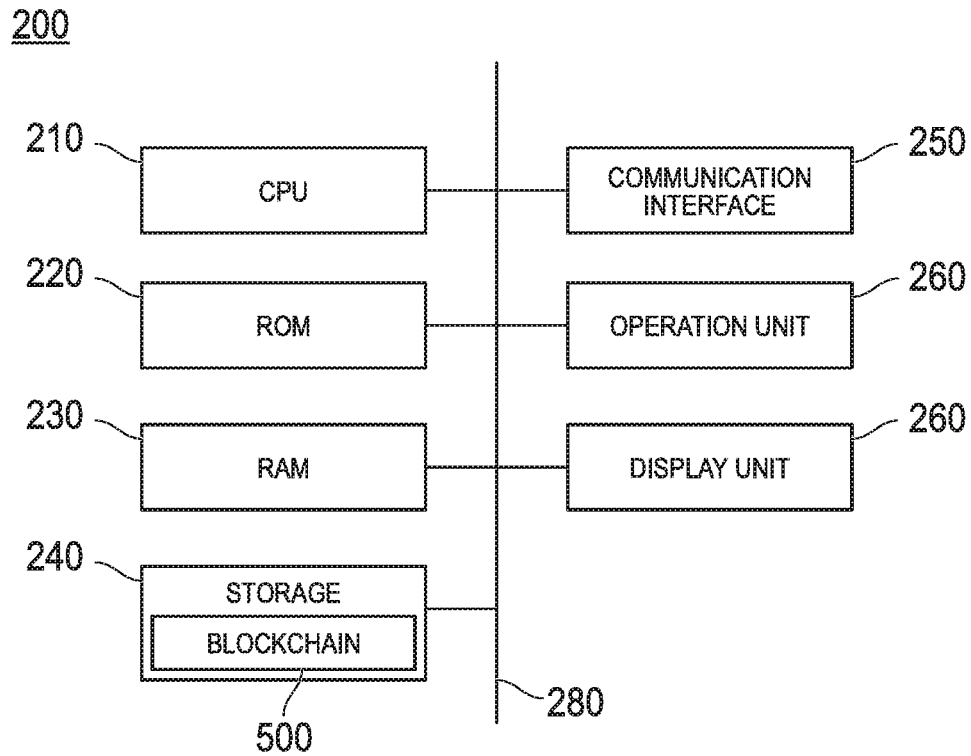
FIG. 3 is a block diagram illustrating a schematic configuration of a currency information processing server.

FIG. 3 is a block diagram illustrating a schematic configuration of a currency information processing server.

As illustrated in FIG. 3, the currency information processing server 200 includes a CPU 210, a ROM 220, a RAM 230, a storage 240, a communication interface 250, an operation unit 260, and a display unit 270. The respective configurations are communicably connected to each other via a bus 280. Note that the CPU 210, the ROM 220, and the RAM 230 have the functions similar to those of the CPU 110, the ROM 120, and the RAM 130 of the user terminal 100, and descriptions thereof will be omitted to avoid duplicate descriptions. The CPU 210 functions as a receiving unit, a temporary issuing unit, a setting unit, a notification unit, a cancellation receiving unit, a temporary cancellation unit, and a cancellation setting unit by executing a program stored in the storage 240.

The storage 240 stores various programs including an operating system, and various data. The blockchain 500 in which information associated with the cryptocurrency is recorded is stored in the storage 240. Further, a program for receiving, from the user terminal 100, cryptocurrency issuance request including the first signature of the user related to generation of the cryptocurrency is installed in the storage 240. In addition, a program for issuing (temporary issuing)

temporary cryptocurrency on the blockchain 500 on the basis of the received cryptocurrency issuance request is also installed in the storage 240. In addition, a program for receiving, from the custodian, the second signature of the custodian (custodian signature) related to the temporary cryptocurrency within a predetermined period after the temporary cryptocurrency has been issued is also installed in the storage 240. In addition, a program for setting, in the case where the second signature is confirmed to be valid, the issued temporary cryptocurrency to be processed as valid cryptocurrency that has been approved is also installed in the storage 240.

The communication interface 250 is an interface for communicating with another device via a network, and for example, a standard such as 3G and 4G for mobile telephony, a standard such as Wi-Fi (registered trademark), or the like is used.

The operation unit 260 includes a pointing device such as a mouse or the like, and a keyboard, and is used to perform various inputs.

The display unit 270 is, for example, a liquid crystal display, and displays various kinds of information.

Figure 4:
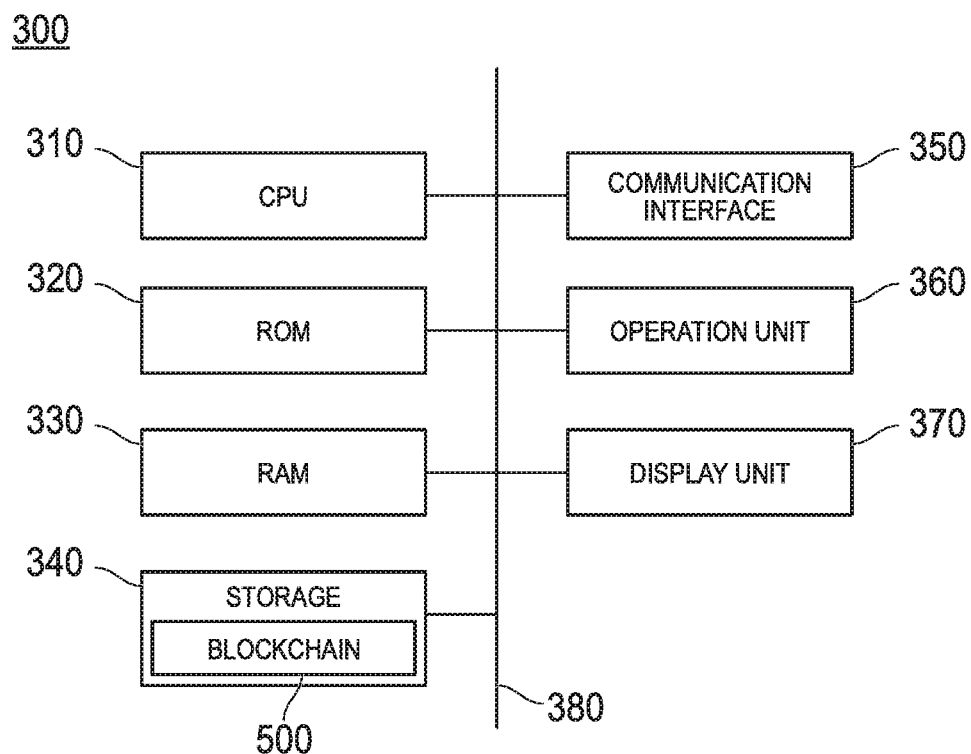
FIG. 4 is a block diagram illustrating a schematic configuration of a custodian system.

FIG. 4 is a block diagram illustrating a schematic configuration of a custodian system.

As illustrated in FIG. 4, the custodian system 300 includes a CPU 310, a ROM 320, a RAM 330, a storage 340, a communication interface 350, an operation unit 360, and a display unit 370. The respective configurations are communicably connected to each other via a bus 380. Note that the CPU 310, the ROM 320, the RAM 330, the storage 340, the communication interface 350, the operation unit 360, and the display unit 370 have functions similar to those of the CPU 210, the ROM 220, the RAM 230, the communication interface 250, the operation unit 260, and the display unit 270 of the currency information processing server 200, and descriptions thereof will be omitted to avoid duplicate descriptions. The CPU 310 functions as a confirmation unit by executing a program stored in the storage 340.

The storage 340 stores various programs including an operating system, and various data. The blockchain 500 in which information associated with the cryptocurrency is recorded is stored in the storage 340. In the storage 340, a program for confirming, on the basis of notification from the user terminal 100, that temporary cryptocurrency corresponding to a predetermined amount has been issued in the currency information processing server 200 and that remittance of the predetermined amount has been executed is installed. Moreover, in the storage 340, a program for generating and transmitting the second signature of the custodian related to the temporary cryptocurrency to the currency information processing server 200 when the issuance of the temporary cryptocurrency corresponding to the predetermined amount and the execution of the remittance of the predetermined amount has been confirmed is also installed.

Note that the respective configurations of the currency information processing system may include components other than the components described above, or may not include a part of the components described above.

Hereinafter, operation of the currency information processing system will be described.

First, a flow of a process for issuing cryptocurrency will be described.

Figure 5:
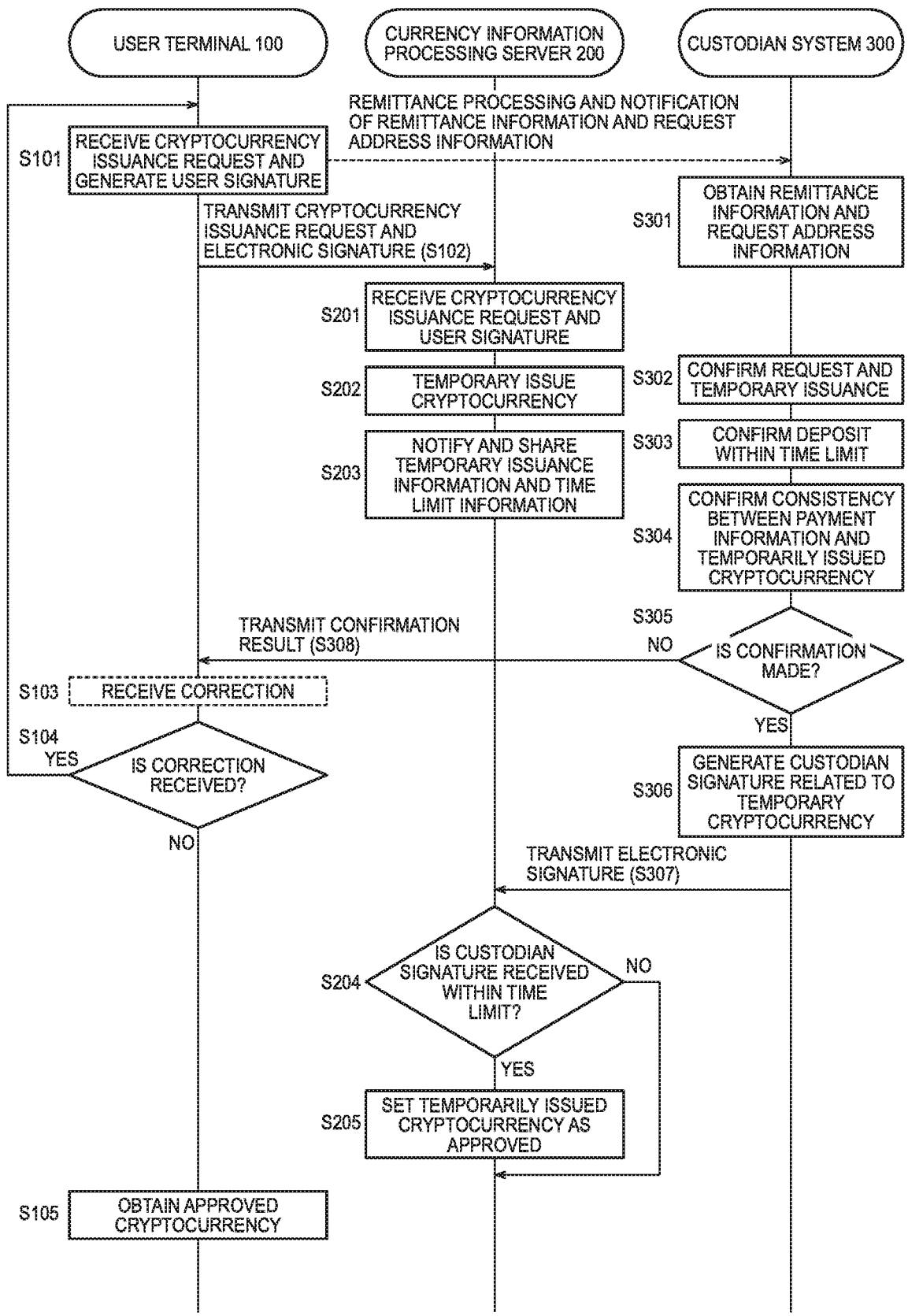
FIG. 5 is a sequence chart illustrating a flow of a cryptocurrency issuance process in the currency information processing system.

FIG. 5 is a sequence chart illustrating a flow of the cryptocurrency issuance process in the currency information processing system. Processing of each device illustrated in the sequence chart in FIG. 5 is stored in the storage of each device as a program, and is executed by the CPU of each device controlling each unit.

As illustrated in FIG. 5, the user terminal 100 receives a request related to issuance of the cryptocurrency in accordance with an instruction from the user, and generates a user signature (step S101). The user signature is an electronic signature generated to prove that the cryptocurrency issuance request is generated by the user, which is executed using a secret key owned by the user.

Further, the user performs remittance processing to the custodian, and notifies the custodian of the information associated with the remittance and the information associated with the transmission of the cryptocurrency issuance request. The processing of the remittance and the notification may be performed on the custodian system 300 using the user terminal 100, or may be performed using another device or method. Furthermore, the remittance processing is not limited to the transfer of money, and other assets such as the ETF, gold, or the like corresponding to the value of the cryptocurrency directed to issuance request may be transferred to the custodian. For example, information associated with the amount to be remitted, the date and time, and the like are included in the information associated with the remittance. For example, address information indicating the address for which the request is performed, the quantity of the cryptocurrency for which issuance is requested, information indicating the designated custodian, and the like are included in the information associated with the transmission of the cryptocurrency issuance request. Information regarding a public key corresponding to the secret key owned by the user for generation of the user signature, and information regarding a public key corresponding to a secret key owned by the custodian for generation of the custodian signature are included in the address information.

Subsequently, the user terminal 100 transmits, to the currency information processing server 200, the cryptocurrency issuance request and the user signature, which are information associated with the request of issuance of the cryptocurrency (step S102). Information associated with the type of the cryptocurrency (currency unit such as yen coin, dollar coin, etc.), the amount, the custodian securing the value, and the like is included in the cryptocurrency issuance request.

Subsequently, the currency information processing server 200 receives the cryptocurrency issuance request and the user signature transmitted from the user terminal 100 (step S201). The currency information processing server 200 confirms that the user signature is valid using the public key of the user included in the address information, and issues the temporary cryptocurrency on the blockchain 500 in the case where the user signature has been confirmed to be valid (step S202). The temporary cryptocurrency is expressed by, for example, data formation similar to that of the valid (formal) cryptocurrency having been approved, and is expressed by setting a flag or the like indicating that it is temporary to be distinguishable from the valid cryptocurrency.

Subsequently, the currency information processing server 200 notifies, via a network, another user terminal 100, the custodian system 300, and the like of temporary issuance information indicating the issuance of the temporary cryptocurrency and information associated with a time limit of the temporary issuance (step S203). The time limit of the temporary issuance is preset in the storage 240 or the like, which is a time limit by which the custodian signature related to the temporary cryptocurrency can be received. The time limit can be expressed by the number of blocks added (mined) in the blockchain as needed. For example, it is possible to set a time limit by which the number of blocks at the time of temporary issuance reaches a predetermined number of blocks. The time limit may be a unit other than the number of blocks, and for example, normal time information may be set as the time limit.

Subsequently, the currency information processing server 200 determines whether the custodian signature has been received within the time limit for the temporary issuance (step S204).

When it has been received within the time limit (YES in step S204), the currency information processing server 200 confirms that the custodian signature is valid using the public key of the custodian included in the address information. When it has been confirmed to be valid, the currency information processing server 200 sets the issued temporary cryptocurrency to be processed as valid cryptocurrency that has been approved (step S205), and disclose the valid cryptocurrency that has been approved on the blockchain.

On the other hand, when the custodian signature is not received within the time limit or when the received custodian signature cannot be confirmed to be valid (NO in step S204), the currency information processing server 200 sets the issued temporary cryptocurrency to be processed as invalid. Alternatively, the currency information processing server 200 may not perform the positive processing of setting the temporary cryptocurrency to be invalid, and may not perform the above-described processing of setting the temporary cryptocurrency to be processed as valid cryptocurrency having been approved. In that case, by checking information on the blockchain 500, each user can confirm that the valid custodian signature has not been obtained within the time limit and is not valid.

Further, the custodian system 300 obtains information such as remittance information, the address on the blockchain for which the cryptocurrency issuance request has been performed, and the like notified from the user terminal 100 or the like in the processing of step S101 (step S301).

Subsequently, the custodian system 300 confirms the existence of the cryptocurrency issuance request and the issuance of the temporary cryptocurrency (temporary issuance) on the blockchain 500 on the basis of the information obtained in the processing of step S301 and the information notified in step S203 (step S302).

Subsequently, the custodian system 300 confirms that the remittance from the user has been made within the time limit and has been deposited in a predetermined account on the basis of the remittance information and the like obtained in the processing of step S301 (step S303). When the remittance processing from the user is not based on money, but is performed by transferring other assets such as the EFT, gold, and the like, the custodian confirms the arrival of those assets and reflects them in the custodian system 300.

Subsequently, the custodian system 300 checks consistency between the payment information confirmed in the processing of step S303, such as the deposit amount, the deposit date and time, and the like, and the information confirmed in the processing of step S302, such as the amount of the temporary cryptocurrency, the time limit for the temporary issuance, and the like (step S304).

Subsequently, the custodian system 300 determines whether a problem such as inconsistency in the amount and the like exists in the confirmation result of each processing of steps S302 to S304 (step S305).

When there is no problem in the confirmation result (YES in step S305), the custodian system 300 generates the custodian signature (step S306), and transmits the generated custodian signature to the currency information processing server 200 (step S307). The custodian signature is an electronic signature generated to prove that the custodian secures the value of the temporary cryptocurrency, which is executed using the secret key owned by the custodian. The currency information processing server 200 that has received the custodian signature from the custodian system 300 performs the processing of steps S204 and S205 to set the temporary cryptocurrency as approved, and notifies the user terminal 100 or the like of the fact via the network. The user terminal 100 obtains the approved cryptocurrency on the blockchain 500 (step S105).

On the other hand, when there is a problem in the confirmation result (NO in step S305), the custodian system 300 transmits the confirmation result to the user terminal 100 (step S308). The user terminal 100 receives the confirmation result from the custodian system 300, and receives an instruction from the user, such as additional remittance, correction of content of the cryptocurrency issuance request, and the like, as necessary (step S103). The user terminal 100 determines whether an instruction for correction or the like has been received (step S104). When the instruction for correction or the like has been received (YES in step S104), the user terminal 100 returns to the processing of step S101. When the instruction for correction or the like is not received (NO in step S104), the user terminal 100 proceeds to the processing of step S105, and obtains the approved cryptocurrency on the blockchain 500.

Next, a flow of a process for terminating cryptocurrency will be described.

Figure 6:
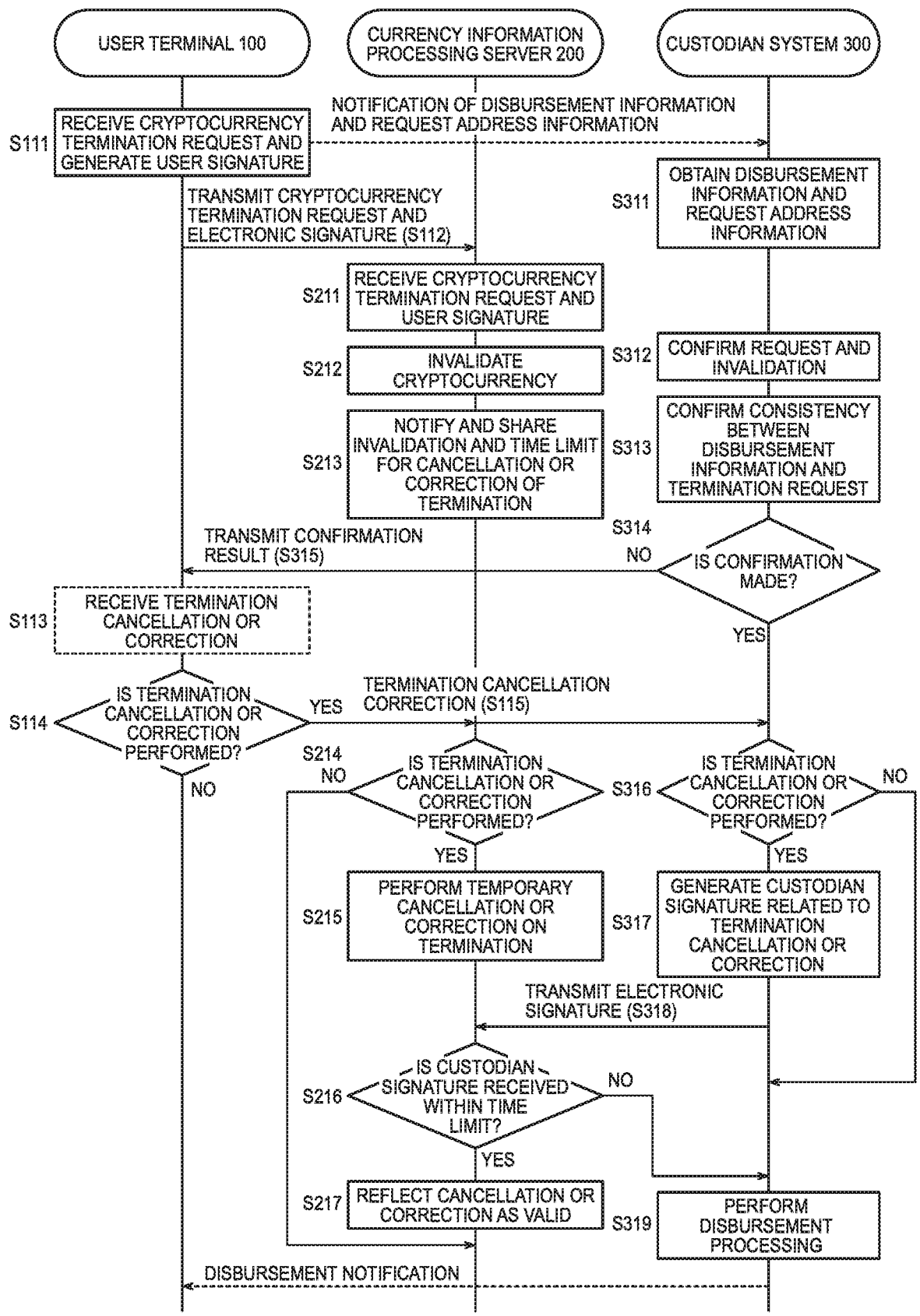
FIG. 6 is a sequence chart illustrating a flow of a cryptocurrency termination process in the currency information processing system.

FIG. 6 is a sequence chart illustrating a flow of the cryptocurrency termination process in the currency information processing system. Processing of each device illustrated in the sequence chart in FIG. 6 is stored in the storage of each device as a program, and is executed by the CPU of each device controlling each unit.

As illustrated in FIG. 6, the user terminal 100 receives a request related to termination of the cryptocurrency in accordance with an instruction from the user, and generates a user signature (step S111). The user signature is an electronic signature generated to prove that the cryptocurrency termination request is generated by the user, which is executed using the secret key owned by the user.

Further, the user notifies the custodian of the information associated with the disbursement and the information associated with the transmission of the cryptocurrency termination request. The notification processing mentioned above may be performed on the custodian system 300 using the user terminal 100, or may be performed using another device or method. For example, information associated with the amount of the cryptocurrency to be withdrawn, the date and time, and the like are included in the information associated with the disbursement. For example, address information indicating the address for which the request is performed, the quantity of the cryptocurrency for which termination is requested, information indicating the designated custodian, and the like are included in the information associated with the transmission of the cryptocurrency termination request. Information regarding a public key corresponding to the secret key owned by the user for generation of the user signature, and information regarding a public key corresponding to a secret key owned by the custodian for generation of the custodian signature are included in the address information.

Subsequently, the user terminal 100 transmits, to the currency information processing server 200, the cryptocurrency termination request and the user signature, which are information associated with the request of termination of the cryptocurrency (step S112). Information associated with the type of the cryptocurrency (currency unit such as yen coin, dollar coin, etc.), the amount, the custodian securing the value of the cryptocurrency, and the like is included in the cryptocurrency termination request.

Subsequently, the currency information processing server 200 receives the cryptocurrency termination request and the user signature transmitted from the user terminal 100 (step S211). The currency information processing server 200 confirms that the user signature is valid using the public key of the user included in the address information, and invalidates the cryptocurrency on the blockchain 500 in the case where the user signature has been confirmed to be valid (step S212). The invalidation is achieved by, for example, setting a flag or the like indicating that it is invalidated to be distinguishable from the valid cryptocurrency.

Subsequently, the currency information processing server 200 notifies, via the network, another user terminal 100, the custodian system 300, and the like of information indicating that the cryptocurrency has been invalidated due to the termination and information associated with the time limit for cancellation or correction of the termination (step S213). The time limit for cancellation or correction of the termination is preset in the storage 240 or the like, which is a time limit by which the custodian signature related to cancellation or correction of the termination of the cryptocurrency can be received. The time limit can be expressed by the number of blocks added (mined) in the blockchain as needed. For example, it is possible to set a time limit by which the number of blocks at the time of invalidation reaches a predetermined number of blocks. The time limit may be a unit other than the number of blocks, and for example, normal time information may be set as the time limit.

Meanwhile, the custodian system 300 obtains information such as disbursement information, the address on the blockchain for which the cryptocurrency termination request has been performed, and the like notified from the user terminal 100 or the like in the processing of step S111 (step S311).

Subsequently, the custodian system 300 confirms the cryptocurrency termination request and the invalidation of the cryptocurrency on the blockchain 500 on the basis of the information obtained in the processing of step S311 and the information notified in step S213 (step S312).

Subsequently, the custodian system 300 checks consistency between the disbursement information confirmed in the processing of step S311 and the information associated with the cryptocurrency termination request confirmed in the processing of step S312 (step S313).

Subsequently, the custodian system 300 determines whether a problem such as inconsistency in the information and the like exists in the confirmation result of each processing of steps S312 and S313 (step S314).

When there is no problem in the confirmation result (YES in step S314), the custodian system 300 proceeds to processing of step S316. The processing of step S316 will be described later.

When there is a problem in the confirmation result (NO in step S314), the custodian system 300 transmits the confirmation result to the user terminal 100 (step S315). The user terminal 100 receives the confirmation result from the custodian system 300, and receives an instruction for cancellation or correction of the termination from the user (step S113). Note that the user terminal 100 can receive the instruction for cancellation or correction of the termination from the user even when the confirmation result has not been received from the custodian system 300. The user terminal 100 determines whether cancellation or correction of the termination is performed (step S114). When cancellation or correction of the termination is not performed (NO in step S114), the user terminal 100 receives disbursement notification from the custodian system 300, and terminates the process. When cancellation or correction of the termination is performed (YES in step S114), the user terminal 100 transmits, to the currency information processing server 200 and the custodian system 300, termination cancellation correction information indicating cancellation or correction of the termination (step S115).

Subsequently, the custodian system 300 determines whether the termination cancellation correction information has been obtained from the user terminal 100 (step S316). This processing may be repeated until, for example, the time limit notified in step S213, or may be repeated until a predetermined time has elapsed since the processing of steps S213, S315, and the like are performed.

When the termination cancellation correction information has not been obtained (NO in step S316), the custodian system 300 performs disbursement processing for the user (step S319), and notifies the user terminal 100 of the fact that the disbursement processing has been performed.

When the termination cancellation correction information has been obtained (YES in step S316), the custodian system 300 confirms that there is no problem in cancellation or correction of the termination, generates a custodian signature (step S317), and transmits the generated custodian signature to the currency information processing server 200 (step S318).

Meanwhile, in the currency information processing server 200 as well, it is determined whether the termination cancellation correction information has been obtained from the user terminal 100 (step S316). This processing may be repeated until, for example, the time limit notified in step S213, or may be repeated until a predetermined time has elapsed since the processing of step S213 or the like is performed.

When the termination cancellation correction information has not been obtained (NO in step S214), the currency information processing server 200 terminates the process.

When the termination cancellation correction information has been obtained (YES in step S214), the currency information processing server 200 performs temporary cancellation processing or correction processing on the termination of the cryptocurrency (step S215). The currency information processing server 200 may notify the user terminal 100 or the custodian system 300 of the fact that the temporary cancellation processing or the correction processing has been performed on the termination to share the fact. The temporary termination cancellation processing or the correction processing is expressed by, for example, setting a flag or the like indicating that it is temporary to data indicating the cryptocurrency in which the termination has been canceled or corrected.

Subsequently, the currency information processing server 200 determines whether the custodian signature has been received within the time limit for the temporary issuance (step S216).

When it has been received within the time limit (YES in step S216), the currency information processing server 200 confirms that the custodian signature is valid using the public key of the custodian included in the address information. When it has been confirmed to be valid, the currency information processing server 200 treats the temporary termination cancellation processing or the correction processing as valid processing that has been approved, and reflects the cancellation or correction of the termination in data indicating the cryptocurrency on the blockchain 500 (step S217). The currency information processing server 200 may notify the user terminal 100 or the custodian system 300 of the fact that the cancellation or the correction has been performed on the termination to share the fact.

On the other hand, when the custodian signature has not been received within the time limit or the received custodian signature has not been confirmed to be valid (NO in step S216), the currency information processing server 200 does not perform the termination cancellation or the correction processing of step S217, and makes notification to the custodian system 300. The custodian system 300 determines that cancellation or correction of the termination is not performed, performs disbursement processing for the user in step S319, and notifies the user terminal 100 of the fact that the disbursement processing has been performed.

According to the present embodiment, the following effects are exerted.

Conventionally, what is called a multi-sig (multi-signature) scheme has been used as a scheme of validating transactions of cryptocurrency on a blockchain on the basis of a plurality of signatures. However, while the multi-sig scheme is to perform transactions on the blockchain on the basis of a plurality of signatures, a transaction can be generated on the blockchain only when the plurality of signatures has become fully available and validity has been confirmed. Therefore, the plurality of signatures needs to be generated using a plurality of secret keys before a transaction is generated on the blockchain. At this stage of generating the plurality of signatures, key information and signature information need to be exchanged through a network with weak security, such as the Internet or the like, or a recording medium to make the plurality of signatures being fully available in the state where the transaction is not disclosed on the blockchain, whereby there has been a risk of hacking or the like.

According to the currency information processing server 200 of the present embodiment, in the method of validating transactions of the cryptocurrency on the blockchain on the basis of a plurality of signatures, when the cryptocurrency issuance request including the user signature is received from the user, the temporary cryptocurrency is issued on the blockchain. In the case where a valid custodian signature related to the temporary cryptocurrency has been received from the custodian within a predetermined period after the temporary cryptocurrency is issued, the issued temporary cryptocurrency is set to be processed as valid cryptocurrency that has been approved. This makes it possible to securely and reliably provide the cryptocurrency on the blockchain in which the value is secured and the value variation risk is reduced.

That is, according to the currency information processing server 200, while using the method of validating transactions, such as issuance of the cryptocurrency and the like, on the blockchain on the basis of a plurality of signatures, a transaction can be set to be in a temporary validated state and disclosed (shared) on the blockchain at the time when a user signature is obtained. Accordingly, the transaction can be disclosed on the blockchain and the transaction can be securely and reliably executed even before the plurality of signatures is not fully available. Then, it is set to be treated as a valid transaction that has been approved at the time when a custodian signature can be obtained, whereby it is possible to provide the cryptocurrency in which the value is secured by the custodian.

In this manner, according to the present embodiment, it becomes possible to secure the asset value of the cryptocurrency on the blockchain using the secure method that allows anyone to confirm the transaction on the blockchain.

In addition, the currency information processing server 200 discloses the valid cryptocurrency that has been approved on the blockchain in the case where the custodian signature has been confirmed to be valid. Accordingly, it is ensured that the cryptocurrency is secured by the custodian, and the cryptocurrency on the blockchain in which the value is secured by the custodian and the value variation risk is reduced can be more securely and reliably provided.

In addition, when the custodian signature is not received from the custodian within a predetermined period of time, or when the received custodian signature is not confirmed to be valid, the currency information processing server 200 sets the issued temporary cryptocurrency to be processed as invalid. Accordingly, the temporary cryptocurrency that has been invalidated without the value being secured by the custodian can be easily noticed, and the cryptocurrency on the blockchain can be more securely and reliably provided.

In addition, the currency information processing server 200 is capable of receiving, from the user, designation of the custodian related to the cryptocurrency, and sets the temporary cryptocurrency to be processed as valid cryptocurrency that has been approved only when the custodian signature is received from the custodian for which the designation has been received. Accordingly, it is possible to prove more reliably that the value of the cryptocurrency is secured by the custodian designated by the user.

In addition, when the temporary cryptocurrency is issued, the currency information processing server 200 makes notification of the fact via the network. Accordingly, the user and the custodian can easily confirm that the temporary cryptocurrency has been issued, and can execute the subsequent transactions smoothly.

In addition, when the temporary cryptocurrency is issued, the currency information processing server 200 makes notification of the information associated with the predetermined period of time via the network. Accordingly, the user and the custodian can be allowed to know the valid period of the temporary cryptocurrency, and can execute the subsequent transactions smoothly.

Furthermore, according to the currency information processing system of the present embodiment, while the method of validating transactions of the cryptocurrency on the basis of a plurality of signatures is adopted, issuance (creation) of the cryptocurrency on the blockchain can be requested even in the state where a plurality of signatures is not fully available. When the first signature of the user is confirmed to be valid, the issuance of the temporary cryptocurrency can be released on the blockchain on the basis of intention of the user. Then, the user designates a custodian that secures the value of the cryptocurrency and remits the amount corresponding to the value of the cryptocurrency to the custodian, and also transmits, to the custodian, information associated with the remitted amount, the address for which the issuance of the cryptocurrency is requested, and the like. For example, in a case where the user issues the cryptocurrency in which the value of 1 million yen is secured on the blockchain, the user requests issuance of "1 million yen coin", remits 1 million yen to the custodian, and notifies the custodian of the fact. The custodian who has received the notification confirms existence of the request information related to the issuance of the "1 million yen coin" on the blockchain, and also confirms payment information such as a deposit amount and the like, and then generates a second signature of the custodian related to the temporary cryptocurrency when the request information on the blockchain is consistent with the payment information. Since only the designated custodian can generate a valid second signature, the fact that the asset is secured by the custodian is made public on the blockchain. When there is inconsistency between the request information and the payment information, the custodian does not generate the second signature for the transaction related to the temporary cryptocurrency. In that case, the custodian may notify the user to correct the inconsistency by, for example, mail, telephone, or the like. In response, the user may perform request again with correct content on the blockchain, or may additionally execute deposit processing or an asset transfer to eliminate the inconsistency. As a result, the asset on the blockchain can be secured by the custodian upon agreement between the user and the custodian in cooperation. In addition, since only the custodian can generate the second signature, the risk of fraudulent actions, such as hacking and tapping, is also suppressed.

The present invention is not limited to the embodiment described above, and various modifications can be made within the scope of the claims.

For example, a part of or all of the functions of the currency information processing server 200 may be implemented as functions of the user terminal 100 or the custodian system 300.

Further, each of the user terminal 100, the currency information processing server 200, and the custodian system 300 may be configured by a plurality of devices, or any device may be included in another device to be configured as a single device.

Furthermore, in the sequence chart described above, a part of the steps may be omitted, or other steps may be added. In addition, a part of each step may be performed simultaneously, or one step may be divided into a plurality of steps and executed. In addition, the order of execution of the respective steps may be changed.

The means and the method for performing various kinds of processing in the system according to the embodiment described above can be achieved by either a dedicated hardware circuit or a programmed computer. The program may be provided by, for example, a computer-readable recording medium such as a flexible disk, a CD-ROM, and the like, or may be provided online via a network such as the Internet and the like. In that case, the program recorded in the computer-readable recording medium is normally transferred to a storage unit, such as a hard disk and the like, and stored therein. Moreover, the program may be provided as a single application software, or may be incorporated into the software of the device as one function of the system.

REFERENCE SIGNS LIST

100 user terminal
110 CPU
120 ROM
130 RAM
140 storage
150 communication interface
160 operation display unit
170 bus
200 currency information processing server
210 CPU
220 ROM
230 RAM
240 storage
250 communication interface
260 operation unit
270 display unit
280 bus
300 custodian system
310 CPU
320 ROM
330 RAM
340 storage
350 communication interface
360 operation unit
370 display unit
380 bus
500 blockchain

The invention claimed is:

1. A currency information processor that processes cryptocurrency in a method of validating a transaction of the cryptocurrency on a blockchain on the basis of a plurality of signatures, the currency information processor comprises a central processing unit (CPU) that:
    receives, from a user, cryptocurrency issuance request including a first signature of the user related to the issuance of the cryptocurrency;
    issues temporary cryptocurrency on the blockchain on the basis of the cryptocurrency issuance request; and
    sets, when a second signature of a custodian related to the temporary cryptocurrency is received from the custodian within a predetermined period after the temporary cryptocurrency is issued and the second signature is confirmed to be valid, the temporary cryptocurrency to be processed as valid cryptocurrency that has been approved.

2. The currency information processor according to claim 1, wherein
    when the second signature is confirmed to be valid, the CPU discloses, on the blockchain, the valid cryptocurrency that has been approved.

3. The currency information processor according to claim 1, wherein
    when the second signature is not received from the custodian within the predetermined period, or when the received second signature is not confirmed to be valid, the CPU sets the temporary cryptocurrency to be processed as invalid.

4. The currency information processor according to claim 1, wherein the CPU;
    received, from the user, designation of the custodian related to the cryptocurrency, and
    sets the temporary cryptocurrency to be processed as a valid cryptocurrency that has been approved, only when the second signature is received from the custodian for which the designation is received.

5. The currency information processor according to claim 1, wherein
    the CPU makes notification of a fact that, via a network, the temporary cryptocurrency has been issued.

6. The currency information processor according to claim 5, wherein
    when the temporary cryptocurrency is issued, the CPU makes notification of information associated with the predetermined period via a network.

7. The currency information processor according to claim 1, wherein the CPU:
    receives, from a user, cryptocurrency termination request including a first signature of the user related to the termination of the cryptocurrency;

sets the cryptocurrency to be invalidated on the blockchain on the basis of the cryptocurrency termination request;

from a user, an instruction for cancellation or correction of termination of the cryptocurrency invalidated on the basis of the cryptocurrency termination request;

performs temporary cancellation or correction of termination on the blockchain on the basis of the instruction for cancellation or correction of termination; and sets, when a second signature of a custodian related to the temporary cancellation or correction of termination is received from the custodian within a predetermined period after the cryptocurrency is invalidated and the second signature is confirmed to be valid, the temporary cancellation or correction of termination to be processed as valid cancellation or correction that has been approved.

8. A currency information processing system that processes cryptocurrency in a method of validating a transaction of the cryptocurrency on a blockchain using a plurality of signatures, the currency information processing system comprising a user terminal, a currency information processor, and a custodian system that are connected via a network, wherein the user terminal includes a first central processing unit (CPU) that:

generates, on the basis of an instruction from a user, cryptocurrency issuance request including a first signature of the user related to the issuance of the cryptocurrency having a value of a predetermined amount of predetermined currency and transmits the cryptocurrency issuance request to the currency information processor; and notifies the custodian system of information associated with remittance of the predetermined amount directed to the custodian system and information associated with the transmission of the cryptocurrency issuance request directed to the currency information processor, the currency information processor includes a second CPU that:

receives the cryptocurrency issuance request transmitted from the user terminal;

issues temporary cryptocurrency on the blockchain on the basis of the cryptocurrency issuance request; and sets, when a second signature of a custodian related to the temporary cryptocurrency is received from the custodian system within a predetermined period after the temporary cryptocurrency is issued and the second signature is confirmed to be valid, the temporary cryptocurrency to be processed as valid cryptocurrency that has been approved, and the custodian system includes a third CPU that:

confirms, on the basis of notification from the user terminal, a fact that the temporary cryptocurrency corresponding to the predetermined amount has been issued in the currency information processor and a fact that remittance of the predetermined amount has been executed; and generates the second signature of the custodian related to the temporary cryptocurrency and transmits the second signature to the currency information processor when issuance of the temporary cryptocurrency corresponding to the predetermined amount and execution of remittance of the predetermined amount are confirmed.

9. The currency information processing system according to claim 8, wherein

The first CPU of the user terminal generates, on the basis of an instruction from the user, cryptocurrency termination request including a first signature of the user related to the termination of the cryptocurrency and transmitting the cryptocurrency termination request to the currency information processor, The first CPU of the user terminal notifies the custodian system of information associated with the termination and information associated with the transmission of the cryptocurrency termination request directed to the currency information processor, the second CPU of the currency information processor receives the cryptocurrency termination request transmitted from the user terminal, the second CPU of the currency information processor sets the cryptocurrency to be invalidated on the blockchain on the basis of the cryptocurrency termination request, the first CPU of the user terminal receives, from the user, an instruction related to cancellation or correction of the termination of the cryptocurrency and transmits the instruction to the currency information processor and the custodian system, the second CPU of the currency information processer performs temporary cancellation or correction of termination on the blockchain on the basis of the instruction received from the user terminal; and that the second CPU of the currency information processer sets, when a second signature of a custodian related to the temporary cancellation or correction of termination is received from the custodian system within a predetermined period after the cryptocurrency is invalidated and the second signature is confirmed to be valid, the temporary cancellation or correction of termination to be processed as valid cancellation or correction that has been approved, and the third CPU of the custodian system generates, on the basis of the instruction received from the user terminal, the second signature of the custodian related to the temporary cancellation or correction of termination and transmits the second signature to the currency information processor.

* * * * *